United States Patent
Dewaele et al.

(10) Patent No.: US 7,382,908 B2
(45) Date of Patent: Jun. 3, 2008

(54) RETROSPECTIVE CORRECTION OF INHOMOGENEITIES IN RADIOGRAPHS

(75) Inventors: Piet Dewaele, Berchem (BE); Gert Behiels, Leuven (BE)

(73) Assignee: Agfa-Gevaert, Mortsel (BE)

(*) Notice: Subject to any disclaimer, the term of this patent is extended or adjusted under 35 U.S.C. 154(b) by 0 days.

(21) Appl. No.: 11/470,165

(22) Filed: Sep. 5, 2006

(65) Prior Publication Data

US 2007/0025603 A1 Feb. 1, 2007

Related U.S. Application Data

(63) Continuation of application No. 10/131,302, filed on Apr. 24, 2002, now Pat. No. 7,110,588.

(60) Provisional application No. 60/294,708, filed on May 31, 2001.

(30) Foreign Application Priority Data

May 10, 2001 (EP) .................................. 01000142

(51) Int. Cl.
*G06K 9/00* (2006.01)
(52) U.S. Cl. .................. 382/132; 382/274; 378/28
(58) Field of Classification Search ................ 382/128, 382/129, 130, 131, 132, 133, 237, 260, 274–276, 382/168–172, 100, 181, 203, 254, 255, 305; 324/307; 342/22; 378/2, 28
See application file for complete search history.

(56) References Cited

U.S. PATENT DOCUMENTS

| | | | | |
|---|---|---|---|---|
| 5,046,118 A | * | 9/1991 | Ajewole et al. | ............. 382/169 |
| 5,351,306 A | * | 9/1994 | Finkler et al. | ............... 382/169 |
| 5,392,046 A | * | 2/1995 | Hughes | ........................ 342/22 |
| 5,915,036 A | * | 6/1999 | Grunkin et al. | ............. 382/132 |
| 6,208,138 B1 | * | 3/2001 | Lai et al. | ..................... 324/307 |
| 6,249,594 B1 | * | 6/2001 | Hibbard | ...................... 382/128 |
| 6,556,720 B1 | * | 4/2003 | Avinash | ...................... 382/260 |

FOREIGN PATENT DOCUMENTS

EP 0 823 691 A1 2/1998

OTHER PUBLICATIONS

European Search Report from corresponding European Patent Application No. EP 01 00 0142, filed on May 10, 2001.
Fure-Ching Jeng et al., "Inhomogeneous Gaussian Image Models for Estimation and Restoration," IEEE Transactions on Acoustics, Speech, and Signal Processing, vol. 36, No. 8, Aug. 1, 1988, pp. 1305-1312.

* cited by examiner

*Primary Examiner*—Seyed Azarian
(74) *Attorney, Agent, or Firm*—Houston Eliseeva LLP

(57) ABSTRACT

Several methods for retrospective correction of intensity inhomogeneities in digital diagnostic radiation images are presented. The methods are based on the correction of a digital image representation by means of a bias field. The bias field is deduced from the digital image representation of the diagnostic radiation image.

6 Claims, 4 Drawing Sheets

RETROSPECTIVE CORRECTION OF INHOMOGENEITIES IN RADIOGRAPHS

RELATED APPLICATIONS

This application is a Continuation of U.S. application Ser. No.10/131,302, filed on Apr. 24, 2002, now U.S. Application Publication No. 2003/0053671 A1, published on Mar. 20, 2003, which claims priority to European Patent Application No. 01000142.8, filed on May 10, 2001, and also claims benefit of U.S. Provisional application No. 60,294,708, filed on Mar. 31, 2005, all of which are incorporated herein by reference in their entirety.

FIELD OF THE INVENTION

The present invention relates to a method for correcting inhomogeneities in a digital radiation image which are inherent to the use of a radiation source, a radiation detector or a radiation image read-out apparatus or the like.

BACKGROUND OF THE INVENTION

Digital radiography offers the possibility for computer aided diagnosis and quantitative analysis using image processing techniques such as segmentation, classification and contrast enhancement. However, computer-based image interpretation may be hindered by the presence of the non-uniformities in radiation exposure that are inherent to the image formation.

In the field of X-ray exposure these non-uniformities can be largely attributed to the Heel effect, nevertheless other sources of inhomogeneities exist such as recording member non-uniformities or read-out inhomogeneities.

Although the intensity inhomogeneities induced by all these factors are smoothly varying as a function of location and are easily corrected by the human visual perception system, they complicate the use of automatic processing techniques because the relative brightness of an object within the image becomes position dependent. The overall intensity range is unnecessarily enlarged by the presence of these slowly varying shading components and hence the dynamic range available to represent diagnostic signal details is reduced.

A typical hand radiograph is shown in FIG. 1. The background at the left side of the image is clearly brighter than at the right side. This phenomenon can be attributed to the so-called Heel effect. Because beam collimator blades substantially attenuate the X-ray beam so as to shield irrelevant body parts, the phenomenon is only visible in the direct exposure and diagnostic areas and not in the collimation area. The Heel effect can be understood from the construction of the X-ray tube as schematically depicted in FIG. 2. Electrons originating from the cathode are attracted by the positively charged anode. For better heat dissipation, the anode rotates and is inclined by a small anode angle θ, which enlarges the area $A_{actual}$ that is bombarded by electrons while keeping the size of the focal $A_{eff}$, from, which rays are projected downward to the object, fairly small. As shown in the diagram of FIG. 3, this design makes the length of the path travelled by the X-rays through the anode larger on the anode side of the field $T_a$ than on the cathode side $T_c$. Hence the incident X-ray intensity is smaller at the anode side than at the cathode side of the recording device, which explains the inhomogeneity of the background in FIG. 1.

The Heel effect is one possible cause of Intensity inhomogeneities that can be introduced in radiographs. As has already been mentioned higher, other causes of non-uniformities might be envisioned such as non-uniform sensitivity of the recording member, e.g. a photographic film, a photostimulable phosphor screen, a needle phosphor screen a direct radiography detector or the like. Still another cause might be non-uniformities of the read-out system which is used for reading an image that has been stored in a recording member of the kind described above.

Because the image acquisition parameters that affect intensity inhomogeneity vary from image to image (e.g. variable positioning of the recording device relative to the X-ray source) and can not be recovered from the acquired image at read-out, correction methods based on calibration images or flat field exposure such as the one described in EP-A-823 691 are not feasible.

The method disclosed in EP-A-823 691 comprises the steps of (1) exposing an object to radiation emitted by a source of radiation, (2) recording a radiation image of said object, on a radiation-sensitive recording member, (3) reading the image that has been stored in said recording member and converting the read image into a digital image representation, (4) generating a set of correction data and (5) correcting said digital image representation by means of said set of correction data. The set of correction data is deduced from data corresponding with a uniform, flat field exposure of the recording member. The set of correction values represent the deviation of the value that is effectively obtained in a pixel of the recording member and a value that would be expected in the case of flat field exposure. These correction values associated with each recording member are normally determined once and kept fixed during further acquisition cycles.

This type of methods is not applicable for solving problems such as the introduction of inhomogeneities due to the Heel effect.

OBJECTS OF THE INVENTION

It is an object of the present invention to provide a method to correct a digital image for artifacts such as artifacts which are inherent no the use of an X-ray tube, artifacts originating from defects in a radiation detector or the like.

Further objects will become apparent from the description hereafter.

SUMMARY OF THE INVENTION

The above mentioned objects are realised by a method having the specific features set out in claim 1.

Unlike the state of the art methods, in the present invention a set or correction data is deduced from the actual image data obtained by exposing an object to radiation and not from an additional image such as an image representing a flat field exposure.

A radiation image most generally comprises a Collimation area which is an area that has been shielded from exposure to radiation by shielding elements, a direct exposure area (also called background area) being the area on the recording member that has been exposed to direct, unmodulated irradiation and a diagnostic area which is the area where the radiation image is found of the body that was exposed to radiation.

Because of substantial attenuation of the X-ray beam when passing through the collimator blades, the dynamic range of the irradiation has been reduced to an extent so as to make these collimation areas unsuitable for estimation of the correction values.

Because the causes that introduce inhomogeneities are not present in the collimation area the collimation area can be neglected in the method of the present invention. A segmentation algorithm can be used to find the boundaries of the collimation area to exclude these areas from further consideration. An example of such an algorithm has been described in European patent applications EP-A-610 605 and EP-A-742 536 (for the case of a partitioned image), these documents are incorporated by reference.

FIRST EMBODIMENT

In one embodiment (1) a mathematical model representing the phenomenon that induces the inhomogeneities is generated. Next (2) the digital image representation is subjected to image segmentation in order to extract data representing an estimation of the direct exposure area. Then, (3) parameters of this model are deduced from image data representing the direct exposure area in the image. Next (4) bias field is generated on the basis of the deduced parameters. Next, (5) a correction by means of said bias field is applied to the image data. Corrected image data are then subjected to a stopping criterion. Unless this stopping criterion is met, steps (2) to (6) are repeated.

Because the inhomogeneities are only directly measurable in the directs exposure areas or the image, this area is preferably first extracted and the parameters of the model are estimated from the data regarding this region only. A seed fill algorithm can be used to determine the background area. The seed fill algorithm can be started front the boundary of the collimation area.

Inhomogeneity correction by applying a bias field is performed on the entire image. In the context of the present invention the term 'a bias field' is used to denote a low frequency pattern that is superimposed on the average image data values in a multiplicative or additive manner.

Next a new background region is extracted from the corrected image data and the model parameters are re-estimated. This sequence is repeated. The method iterates between background segmentation and correction until convergence, i.e. until no significant changes in background or parameter estimation occur.

SECOND EMBODIMENT

In a second embodiment according to the present invention a statistical model of the image is first generated on the basis or intensity and spatial statistics of image regions in the image.

The digital image representation is then subjected to image segmentation in order to extract data, constituting, an estimation of these image regions. The image regions referred to are e.g. direct exposure area, bone image, soft tissue image etc.

Parameters of the statistical mode are estimated by means of data pertaining to these image regions. Next, a bias field comprising correction data is generated and the entire image, is corrected by means of the bias field. The result of the previous step is evaluated relative to a stopping criterion. The method steps of segmenting, bias field correction and evaluation are repeated until the stopping criterion is met. The stopping criterion is e.g. reached when no significant changes occur in the estimation of the image regions and/or no significant changes occur in the parameters defining the statistical model.

In one embodiment the image regions are confined to direct exposure areas. In another embodiment (see fourth embodiment) the method steps are applied separately to each of a number of image region classes jointly constituting the intensity histogram of the radiation image.

In one embodiment the statistical model is a Gaussian distribution and the parameters of the statistical model are the statistical parameters defining the statistical model such as average value $\mu$ of the Gaussian distribution and the standard deviation $\sigma$.

The stopping criterion is e.g. reached when no significant changes occur in the estimation of image regions and/or no significant changes occur in the parameters defining the statistical model.

THIRD EMBODIMENT

A third embodiment is based on the observation that the entropy of an image increases if inhomogeneities are induced in the image.

In a third embodiment of the method of the present invention an information theoretic model of the image comprising a least direct exposure areas and diagnostic areas is generated. The model is based on Shannon-Wiener entropy increasing when additional intensity value entries are added to the image intensity distribution. The digital image representation is subjected to image segmentation in order to extract data representing an estimation of the direct exposure areas and the entropy in said models extracted based on of data pertaining to these areas. Next, a bias field is generated and the entire image is corrected by means of the bias field. The result of the previous step is evaluated relative to a stopping criterion and the method is repeated until said stopping criterion is met. A stopping criterion is e.g. met when the entropy is minimal and no significant changes occur in it.

FOURTH EMBODIMENT

The fourth embodiment is a more general case of the second embodiment in this fourth embodiment the method steps of the second embodiment are applied separately to each of a number of image region classes jointly constituting the intensity histogram of the radiation image.

In all of the aforementioned embodiments, the number of iterations may be restricted to one when less precision is needed and hence the stopping criterion need not be evaluated.

Further advantages and embodiments of the present invention will be one apparent from the following description [and drawings].

DETAILED DESCRIPTION OF THE INVENTION

First Embodiment

Figure 4:
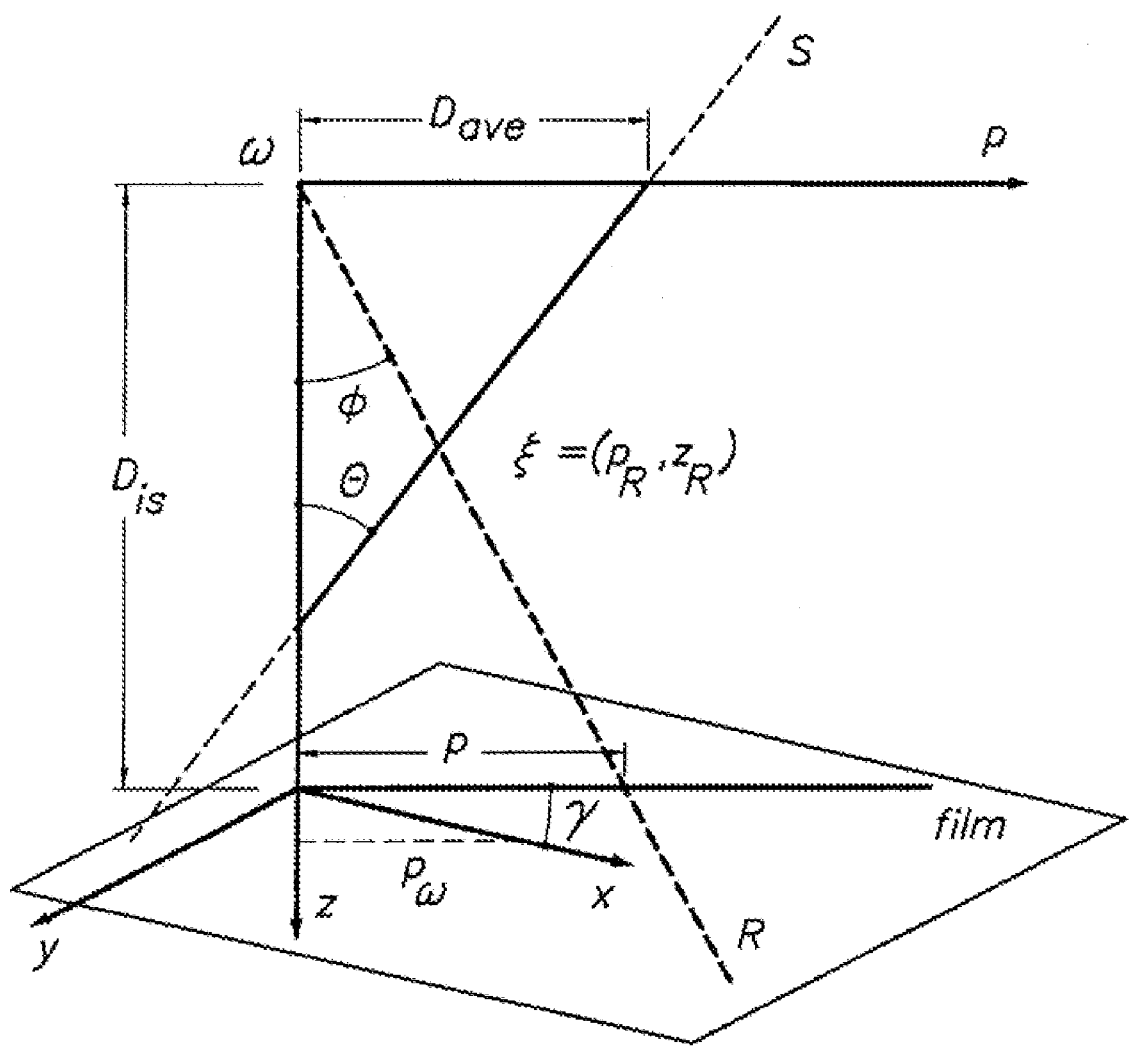
FIG. 4 is a coordinate system, wherein an X-ray originates at position (0,0) and travels along R to the recording medium at position (p, $D_{ts}$).

A mathematical model for the Heel effect can be derived from the simplified one-dimensional model of the anode and bean geometry depicted in FIG. 4. In the coordinate system (p,z), with p along the anode-cathode axis and z along the vertical direction, the X-rays can be taught off to originate within the anode at point $\omega(0,0)$, at a distance $D_{ave}$ from the anode surface S. Consider the ray R at an angle $\phi$ from the vertical within the plane $(\omega,S)$ that hits the recording device at point $(p,D_{is})$ with $D_{is}$ the distance between the X-ray source and the recording device and $$\tan\phi = \frac{p}{D_{is}}.$$

The distance r traveled by R through the anode is given by $$r=|\xi-\omega|=\sqrt{p_R^2+z_R^2} \qquad (1)$$

with $\xi(p_R,z_R)$ the intersection of R with S which can be found by solving the system of equations:

$$S: p_R = D_{ave} - \tan\delta \cdot z_R \qquad (2)$$

$$R: p_R = \tan\phi \cdot z_R$$

Hence, $$r(p) = D_{ave}\frac{\cos\theta}{\sin(\phi+\theta)} = D_{ave}\frac{\sqrt{1+\left(\frac{p}{D_{is}}\right)^2}}{\tan\theta + \frac{p}{D_{is}}} \qquad (3)$$

The radiation received on the recording device is $$M(p) = I_o e^{-\mu \cdot r(p)} \qquad (4)$$

with $\mu$ the attenuation coefficient of the anode material and $I_o$ the radiation originating at $\omega$.

Model (4) predicts that the Heel effect behaves exponentially along the anode-cathode axis and assumes that it is constant perpendicular to this axis. This is justified by flat filed exposure experiments which show that the difference in intensity perpendicular to the anode-cathode axis is relatively small compared to the intensity differences along the anode-cathode axis.

Figure 1:
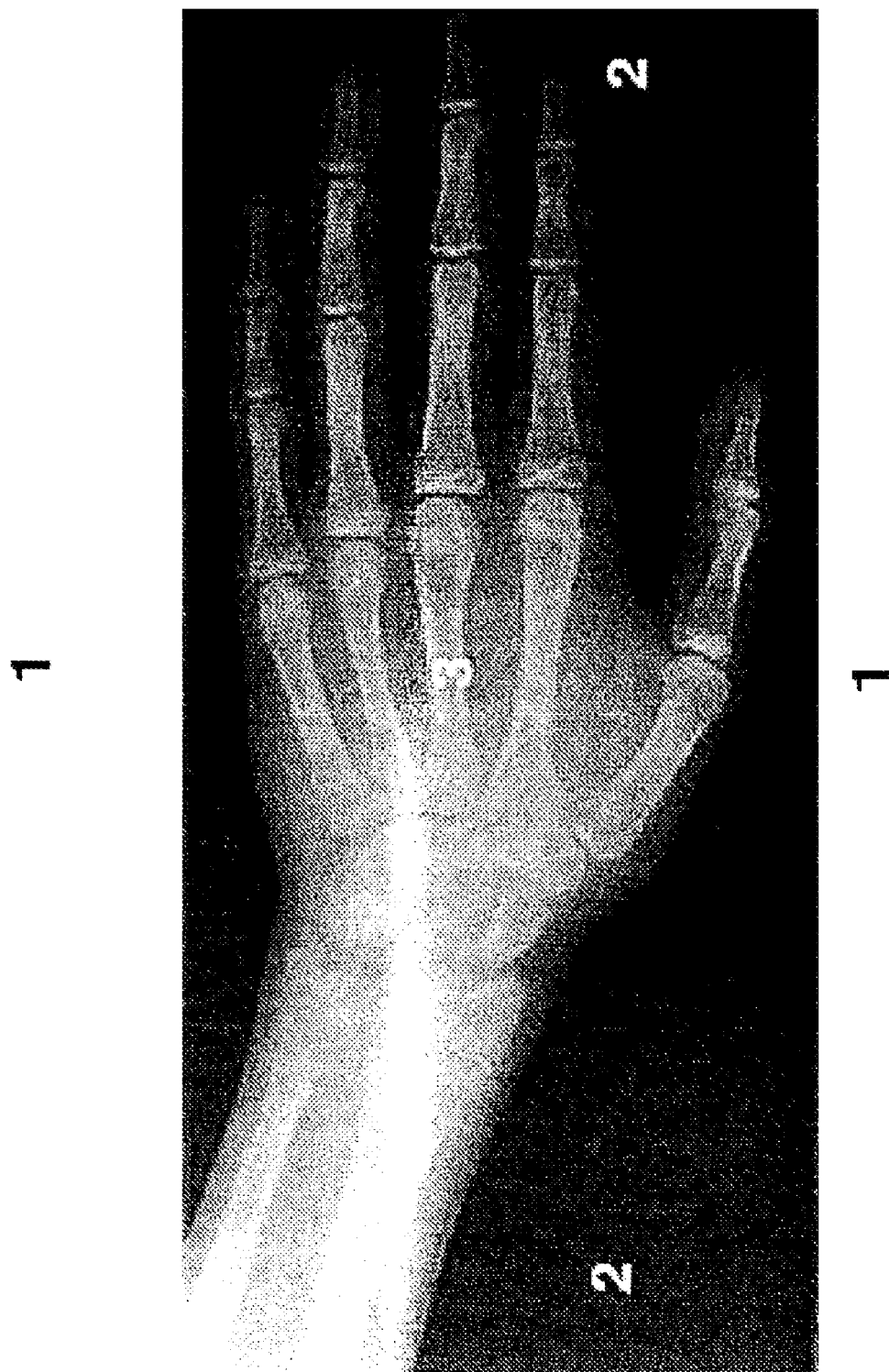
FIG. 1 shows a typical radiographic image of a hand in which the Heel effect is clearly visible on the direct exposure area.

Image Segmentation:

A typical hand radiograph, as shown in FIG. 1, consists of three regions: collimation area (numeral 1), direct exposure area (numeral 2) and diagnostic regions (numeral 3). Because the Heel effect is largely reduced in the collimation area and directly measurable in the direct exposure area only, the image needs to be segmented to fit model (4) to the image intensity data. This is obtained by first extracting the collimation area and then searching the direct exposure area, the remaining areas being diagnostic regions.

The boundaries of the collimation area have been round using the Hough transform assuming that these are rectilinear edges as is the case for the majority of X-ray source-mounted collimation devices. To make this approach more robust, the contributions of each image point to the Hough space accumulator are weighted by said point's gradient magnitude and, for each point, only lines the direction of which is within 10 degrees from the normal local gradient direction are considered. The 4 most salient points in Hough space that represent a quadragon with inner angles between 80 and 100 degrees are selected as candidate boundaries of the collimation area. Because not all 4 collimation shutter blades leave an imprint in the image and hence make the associated boundaries disappear in the image, candidate boundaries along which the image intensity differs from the intensity expected for the collimation region are rejected.

To extract the background region B, a seed fill algorithm has been used that starts from the boundary of the collimation region as determined in the previous step. Appropriate seed points for B are found by considering a small band along each of the collimator edges and retaining all pixels whose intensity is smaller than the mean of the band. This approach avoids choosing pixels that belong to the diagnostic region as candidate seed pixels. B is then grown by considering all neighboring pixels $n_i$, i=1, . . . , 8 of each pixel $p \in B$ and adding $q_i$ to B if the intensity difference between p and $q_i$ is smaller than some specified threshold.

Heel Effect Estimation:

To fit the model (4) to the image data N (x,y) the direction $\gamma$ has to be found of the anode-cathode axis and the parameters $\alpha=[I_O,\mu,\delta,D_{is},D_{ave},p_\omega]$ such that the model best fits the image data within the direct exposure area extracted thus far. $p_\omega$ is a parameter introduced to map point $\omega$ where the X-ray originates to the correct image coordinates (see FIG. 4). For the case whereby the Heel effect is modulated as a one-dimensional phenomenon, the distance $p_\omega$ and the angle $\gamma$ are the required parameters to map the coordinate system attached to the X-ray origin, $\omega$ to the image plane coordinate system, However, because the anode has the three-dimensional shape of a cone, the Heel effect is a three dimensional phenomenon, in that at the intensity also slightly is reduced in a direction perpendicular to the (p,z) plane. To model the two-dimensional Heel effect in the image plane, a third geometry parameter $p_{\omega 1}$ is needed. Parameters $(p_\omega,p_{\omega 1},\gamma)$ jointly define a coordinate system translation and rotation from the X-ray origin $\omega$ to an image plane origin, which is the center of the image e.g. in practice the Heel effect inhomogeneity in, said perpendicular direction is only small with respect to the Heel effect along the anode-cathode axis.

Figure 3:
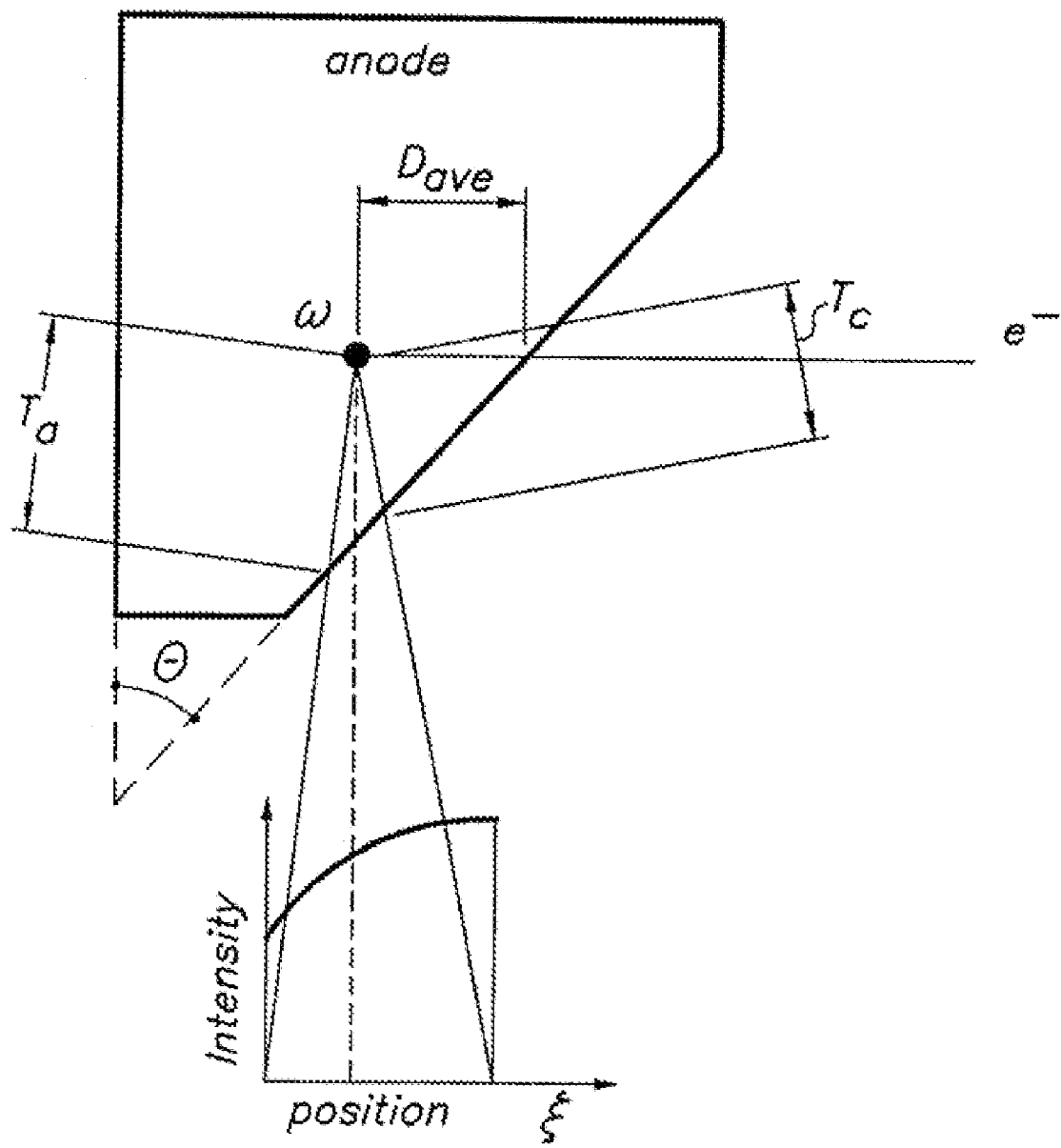

Assuming that $\gamma$ is known, the average image profile $P_\gamma(p)$ along this direction in the direct exposure region B is given by $$P_\gamma(p) = [N(x,y)]_{(x,y) \in B | x \cdot \cos\gamma + y \cdot \sin\gamma = p}$$

with x and y the image coordinates as defined in FIG. 3 and [.] the averaging operator. We can then find the optimal model parameters $\alpha^*$ by fitting the expected profile M $(p,\alpha)$ to the measured profile.

$$\alpha^*(\gamma) = \underset{\alpha}{\arg\min} \|P_\gamma(p) - M(p,\alpha)\| \qquad (5)$$

The fitted one-dimensional model $M(p,\alpha^*(\gamma))$ is then back projected perpendicular to the projection axis $\gamma$ to obtain a reconstruction $R(x,y,\gamma,\alpha^*(\gamma))$ for the whole image:

$$R(x,y,\gamma,\alpha^*(\gamma)) = M(x \cdot \cos\gamma + y \cdot \sin\gamma, \alpha^*(\gamma))$$

The direction of the anode-cathode axis $\gamma$ is then determined such that this reconstruction best fits the actual image data within the direct exposure region using $$\gamma^* = \underset{\gamma}{\arg\min} \|N(x,y) - R(x,y,\gamma,\alpha^*(\gamma))\|_{(x,y) \in B} \qquad (6)$$

or $$\gamma^* = \underset{\gamma}{\arg\min} \left\| \frac{N(x,y)}{R(x,y,\gamma,\alpha^*(\gamma))} - 1 \right\|_{(x,y) \in B} \qquad (7)$$

depending on whether we wish to use additive or multiplicative correction. The estimated Heel effect is R(x,y,γ*, α*(γ*)) and the corrected image is respectively $$\hat{N}(x, y) = N(x, y) - R(x, y, \gamma^*, \alpha^*(\gamma^*)) \quad (8)$$

or $$\hat{N}(x, y) = \frac{N(x, y)}{R(x, y, \gamma^*, \alpha^*(\gamma^*))}. \quad (9)$$

The optimal parameters α* and γ* are found by multidimensional downhill simplex search. It has been noticed that the anode-cathode axis in, our setup is almost always parallel to the image or collimation edges, This reduces the number of orientations which have to be evaluated in (6-7) and reduces computation time.

After inhomogeneity correction of the image using (8-9), the direct exposure area B is up-dated by thresholding, using a threshold derived from the histogram of the corrected image intensities $\hat{N}$. Keeping the previously determined anode-cathode orientation γ, new values for the optimal model parameters α* are determined using (5) taking the newly selected direct exposure region into account. A number of iterations, typically three or four, have been performed between background segmentation and Heel effect correction until convergence.

Second and Third Embodiment

Image Formation:

In ideal circumstances, the image formation process or diagnostic digital X-ray images is usually well described by a multiplicative model yielding an intensity-uniform image U(x,y):

$$U(x,y) = I.O(x,y)$$

where O(x,y) represents the object in the image. In diagnostic X-ray images, the most important contributing process of the object is the linear attenuation of the X-rays by the bone and soft tissue $$O(x,y) = e^{-\int_\omega^\zeta \mu(r) dr}$$

μ is the linear attenuation coefficient along the path between the origination X-ray at position ω and the recording device ζ. However, nonuniform illumination I=I(x,y), uneven sensitivity of the recording device and inhomogeneous sensitivity of the phosphors for readout, introduce unwanted intensity modulations in the acquired image N(x,y) described by function $f$ $$N(x,y) = f_{x,y,U}(U(x,y)) \quad (10)$$

Figure 2:
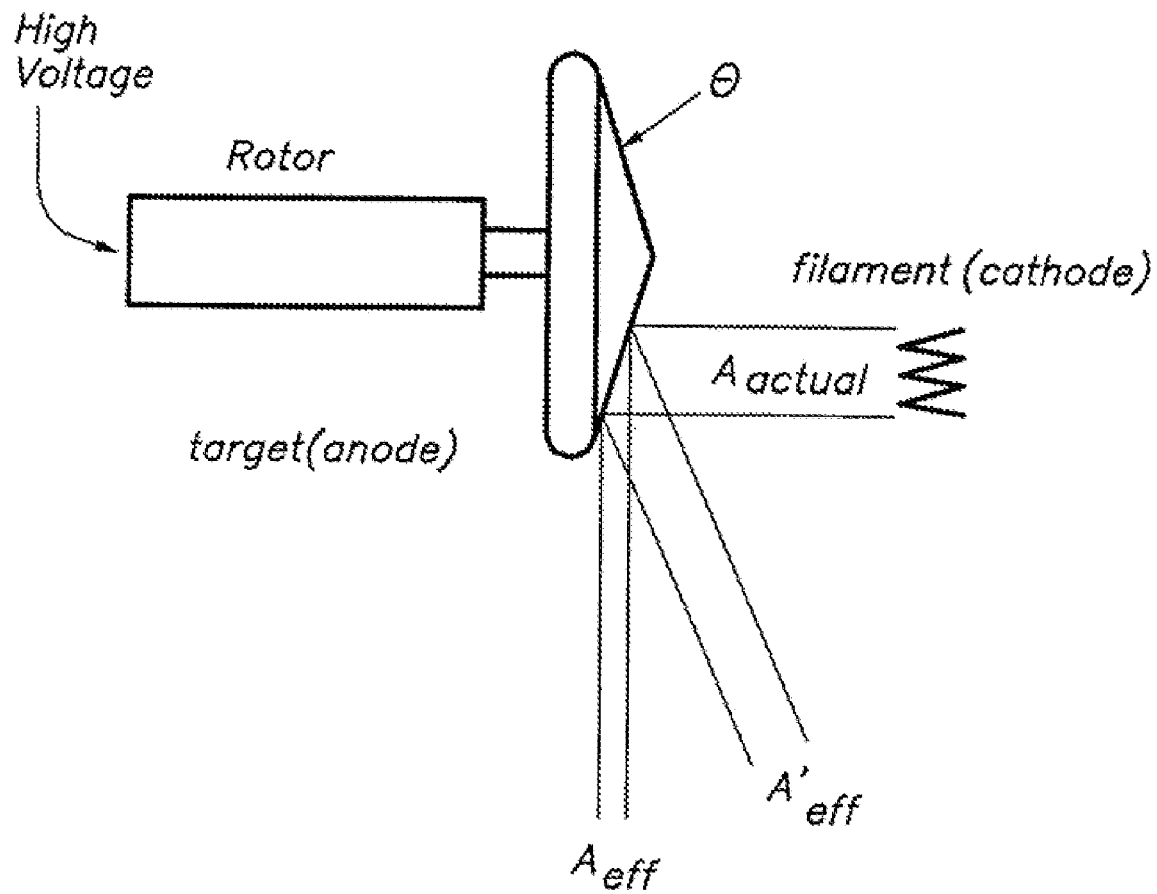
FIGS. 2 and 3 are schematic side views of an X-ray tube.

In the second and third embodiment the Heel effect is again, examined as a very important source of nonuniform illumination. Reference is made to FIGS. 2-4 which aid in explaining this effect.

Electrons originating from the cathode are attracted by the positively charged anode. For better heat dissipation, the anode rotates and is inclined by a small anode angle δ, which enlarges their area $A_{actual}$ that is bombarded by electrons while keeping the size of the focal spot $A_{eff}$, from which rays are projected downward to the object, fairly small. As shown in the FIG. 3, the design makes the length of the path travelled by the X-rays through the anode larger on the anode side of the field ($T_a$) than on the cathode side ($T_c$).

Hence the incident X-ray intensity is smaller at the anode side of the recording device. A simple theoretical model is given by $$I(x, y) = I_o e^{-\mu D_{ave} \frac{\sqrt{1+\left(\frac{p}{D_{is}}\right)^2}}{\tan\hat{\theta} + \frac{p}{D_{is}}}} \quad (11)$$

with $I_o$ the radiation originating at ω, μ the linear attenuation coefficient of the anode, $D_{ave}$ the average distance traveled through the anode by the electrons, $D_{is}$ the distance between the X-ray source and the recording device and p the distance from the recording device to X-ray source projected onto the anode-cathode axis.

Although the second and third embodiment are explained with reference to the Heel effect, other source of inhomogeneities may be envisaged such as the molding process of imaging plates and/or the characteristics of the read-out system. In some fabrication processes, the concentration of phosphors at the edge of the plate is lower than the concentration in the middle of the plate which may result in a non-uniform image. In read-out apparatuses comprising mirror deflection, the displacements of the mirror has to be very accurately implemented to achieve uniform activation of the phosphors for read-out. Due to all these factors it is almost impossible to model the induced inhomogeneities correctly and more general image formation models are needed.

Problem Formulation:

The image formulation process is generally modeled with a function $f$ applied to an ideal intensity-uniform image U(x,y), resulting in the acquired image N(x,y). In digital X-ray images, the image degradation process dependency on the intensity values U(x,y) is relatively small compared to position dependent factors. Hence, we can rewrite equation (10) as follows $$N(x,y) = f_{x,y}(U(x,y))$$

This equation can be simplified as $$N(x,y) = U(x,y)S_M(x,y) + S_A(x,y)$$

where $S_M(x,y)$ and $S_A(x,y)$ represent the multiplicative and additive components of the image degradation process. To remove the image inhomogeneities, a corrected image $\hat{U}$ is searched which optimally estimates the true image U. If the estimates $\hat{S}_A$ and $\hat{S}_M$ of the actual formation components $S_A$ and $S_M$ are available, the corrected image $\hat{U}$ is given by the inverse of the image formation model $$\hat{U}(x, y) = \frac{N(x, y) - \hat{S}_A(x, y)}{\hat{S}_M(x, y)}$$

$$= N(x, y)\tilde{S}_M(x, y) - \tilde{S}_A(x, y)$$

with $$\tilde{S}_M(x, y) = \frac{1}{\hat{S}_M(x, y)} \text{ and } \tilde{S}_A(x, y) = \frac{\hat{S}_A(x, y)}{\hat{S}_M(x, y)}.$$

The problem of correcting the inhomogeneities is thus reformulated as the problem of estimating the additive and multiplicative components $\tilde{S}_A$ and $\tilde{S}_M$.

Correction Strategy:

Finding the optimal parameters of the components $\tilde{S}_A$ and $\tilde{S}_M$ involves defining a criterion which has to be optimized. In this section, two criterions are defined.

One correction strategy (second embodiment of the method according to the present invention) is based on the assumption that the intensity values of the direct exposure area (also referred to as background) from the acquired image is Gaussian distributed. In ideal circumstances, this assumption is true for the acquired image N(x,y). The likelihood that a pixel $\mu_i$ of the corrected image belongs to the background is $$p(u_i | \mu, \sigma) = \frac{1}{\sqrt{2\pi\sigma^2}} \exp\left(-\frac{1}{2}\frac{(u_i - \mu)^2}{\sigma^2}\right) \quad (12)$$

where $\mu$ and $\sigma^2$ are the true mean and variance of the Gaussian distribution of the background pixels. Given an estimate $\hat{B}$ of the direct exposure area, we seek to maximize the likelihood $\pi_{i \in \hat{B}} p(u_i|\mu,\sigma)$, which is equivalent to minimizing the log-likelihood $$\hat{U}^* = \underset{\hat{B},\hat{U}}{\operatorname{argmin}} - \sum_{i \in \hat{B}} \log_e p(u_i | \mu, \sigma). \quad (13)$$

Another embodiment (third embodiment of the method of the present invention) is based on the assumption that the information content of the acquired image is higher than the information content of the uniform image, due to the added complexity of the imposed inhomogeneities:

$$I_c(N(x,y))=I_c(f_{x,y}U(x,y)))>I_c(U(x,y))$$

The information content $I_c$ can be directly expressed by the Shannon-Wiener entropy $$I_c(N(x, y)) = H(N(x, y)) = -\sum_n p(n)\log_e p(n) \quad (14)$$

where p(n) is the probability than a, point in image N(x,y) has intensity value n. The optimal corrected image $\hat{U}^*$ is thus given by $$\hat{U}^* = \underset{\hat{U}}{\operatorname{argmin}} H(\hat{U}(x, y)) \quad (15)$$

Method

Because the Heel effect is totally reduced in the collimation area and an estimate of the background $\hat{B}$ is needed to optimize equation (13), a segmentation algorithm is presented.

In the next, implementation details of the correction models of the second and third embodiment of the method according to the present invention are given.

Image Segmentation

The boundaries of the collimation area have been found using the Hough transform, assuming that these are rectilinear edges as is the case for all hand radiographs in our database. To make this approach more robust, the contributions of each image point to the Hough accumulator are weighted by its gradient magnitude and, for each point, only the lines whose direction is within 10 degrees of the normal to the local gradient direction are considered. The 4 most salient points in Hough space that represent a quadragon with inner angles between 80 and 100 degrees are selected as candidate boundary of the collimation area. Because not all 4 collimation boundaries are always present in the image, candidate boundaries along which the image intensity differ from the expected intensity values for the collimation region, are rejected.

To extract the background region B, a seed fill algorithm is used that starts from the boundary of the collimation region as determined in the previous step. Appropriate seed points for B are found by considering a small band along each of the collimator edges and retaining all pixels whose intensity is smaller than the mean of the band. This approach avoids choosing pixels that belong to the diagnostic region as candidate seed pixels. The background region is then grown by considering all neighboring pixels $n_i$,i=1, . . . 8 of each pixel p∈$\hat{B}$ and adding $q_i$ to $\hat{B}$ if the intensity difference between p and q is smaller than some specified threshold.

Maximum Likelihood Estimation

We simplify (13), by leaving out the multiplicative component $\tilde{S}_M$ of the image degradation process $$\hat{U}^* = \underset{\hat{B},\hat{U}}{\operatorname{argmin}} - \sum_{i \in \hat{B}} \log_e p(u_i | \mu, \sigma) \quad (16)$$

$$= \underset{\hat{B},\hat{U}}{\operatorname{argmin}} - \sum_{x,y \in \hat{B}} \log_e p(U(x, y) | \mu, \sigma)$$

$$= \underset{\hat{B},\hat{U}}{\operatorname{argmin}} - \sum_{x,y \in \hat{B}} \log_e p(N(x, y) - \tilde{S}_A(x, y) | \mu, \sigma)$$

This equation is optimized by iteratively estimating the background $\hat{B}$ and finding parameters $\mu$, $\sigma$ and the components $\tilde{S}_A$ after differentiation and substitution of $p(u_i|\mu,\sigma)$ by the Gaussian distribution (12). To find the solution for the multiplicative component, the same approach can be followed after logarithmic transforming the intensity values.

The initial estimate for the background B is taken from the segmentation algorithm described higher. All other estimates for B are computed using a histogram, based threshold algorithm. The threshold is defined as the smallest value of $\epsilon$ satisfying $$\varepsilon^* = \underset{\varepsilon}{\min} \bigcap_{i=1,2,3} \{\varepsilon > \mu + \sigma | p_\beta(\varepsilon_\beta) < p_\beta(\varepsilon_\beta + i)\}$$

$$\varepsilon_\beta = \left[\frac{\varepsilon - \min\hat{U}}{\max\hat{U} - \min\hat{U}}\right] \cdot 255 \quad (17)$$

where $p_\beta(n)$ is the probability that a point in image $\hat{U}_\beta$ has value n and $\mu$, $\sigma$ are the mean and variance of the corrected pixels belonging to the previous background estimate.

The maximum likelihood estimates for the parameters $\mu$ and $\sigma$ of 7, can be found by minimization of $-\Sigma_i \log_e p(u_i|\mu,\sigma)$. The egressions fir $\mu$ is given by the condition that $$\frac{\partial}{\partial \mu}\left(-\sum_i \log_e p(u_i | \mu, \sigma)\right) = 0.$$

Differentiating and substituting $p(u_i|\mu,\sigma)$ by the Gaussian distribution (12) yields:

$$\mu = \sum_{i \in \hat{B}} \frac{u_i}{n} = \sum_{i \in \hat{B}} \frac{N(x_i, y_i) - \tilde{S}_A(x_i, y_i)}{n}$$

where $x_i, y_i$ is the spatial position of pixel i and n is the number of background pixels. The same approach can be followed to derive the expression for $\sigma$:

$$\sigma^2 = \sum_{i \in \hat{B}} \frac{(u_i - \mu)^2}{n}$$

$$= \sum_{i \in \hat{B}} \frac{(N(x_i, y_i) - \mu \tilde{S}_A(x_i, y_i))^2}{n}$$

Suppose that the spatially smoothly varying component $\tilde{S}_A$ can be modeled by a linear combination of K polynomial basis functions $\phi_j(x_i, y_i)$ $$u_i = N(x_i, y_i) - \sum_{j=1,\ldots,K} c_j \phi_j(x_i, y_i)$$

the partial derivative for $c_k$ of (16) set to zero yields $$\sum_{i \in \hat{B}} \left[ N(x_i, y_i) - \mu - \sum_j c_j \phi_j(x_i, y_i) \right] = 0 \; \forall \, k.$$

Solving this equation for $\{c_j\}$ does not seem very tractable, but combining all equations for all k and introducing matrix notation simplifies the problem considerably $$C = \begin{bmatrix} c_1 \\ c_2 \\ \vdots \\ \vdots \end{bmatrix} = AR \tag{18}$$

where A represents the geometry of the image formation model, each of its rows evaluating one basis function $\phi_k$ at all coordinates and R represents the residue image, i.e. the difference between the acquired image and the estimated background mean. In full matrix notation, the equation is $$C = \begin{bmatrix} \phi_1(x_1) & \phi_1(x_2) & \phi_1(x_3) & \cdots \\ \phi_2(x_1) & \phi_2(x_2) & \phi_2(x_3) & \cdots \\ \cdots & \cdots & \cdots & \cdots \\ \cdots & \cdots & \cdots & \cdots \\ \cdots & \cdots & \cdots & \cdots \end{bmatrix} \begin{bmatrix} n_1 - \mu \\ n_2 - \mu \\ \cdots \\ \cdots \end{bmatrix}$$

where $n_i$ is the intensity value of the acquired image at pixel $(x_i, y_i)$. Equation (18) is a least squares fit to the residue image. As least squares fit are sensitive to outliers, only entries in R which satisfy $|n_i - \mu| < 2.5 \, \sigma$ are included to solve (18).

Entropy Minimization

Suppose than the image degradation components $\tilde{S}_A$ and $\tilde{S}_M$ can be modeled by a linear combination of K polynomial bass functions $\phi_j^{m,\alpha}(x,y)$ $$\tilde{S}_M(x_i, y_i) = \sum_{j=1,\ldots,K_m} m_j \phi_j^m(x_i, y_i)$$

$$\tilde{S}_A(x_i, y_i) = \sum_{j=1,\ldots,K_m} a_j \phi_j^a(x_i, y_i)$$

Equation (15) is reformulated as $$\{a^*, m^*\} = \underset{a,m}{\mathrm{argmin}} \{ H(N(x, y) \tilde{S}_M(x, y) - \tilde{S}_A(x, y)) \} \tag{19}$$

The optimal additive parameters $\alpha^*$ and multiplicative parameters $m^*$ are found by Powell's multidimensional directional set method and Brent's one-dimensional optimization algorithm (W. H. Press, S. A. Teukosky, W. T. Vetterling, and B. P. Flannery. Numerical Recipes in C. Cambridge University Press, 1992.)

The set of probabilities p(n) in (14) can be obtained by normalization of its histogram. In order to reduce the influence or random, effects induced by discretizing the histogram, we use partial intensity interpolation at histogram formation. When transforming the image, an integer intensity value g is transformed to a real value g', which in general lies between two integer values k and k+1. The histogram sentries h(k) and h(k+1) are updated by k+1-g' and g'-k respectively, To obtain a smoother decline to the absolute minimum and to minimize the effects of local minima, the obtained histogram is blurred to:

$$\hat{h}(n) = \sum_{i=-t}^{t} h(n+i)(t+1-|i|)$$

where the parameter t was set to 3.

Image Formation Models

We have tested different image formation models which are summarized in, Table 1. The polynomial models are defined as $$\phi^v = c_0 + c_1 x + c_2 y + c_3 x^2 + c_4 xy + c_5 y^2 + \ldots + c_{\frac{(v+2)!}{2!v!}} y^v$$

Model $\Sigma_i, i=1,2$ are included for the maximal likelihood estimation, model $\Sigma_3$ is the general image formation model while model $\Sigma_4$ is derived from (2). Model $\Sigma_5$ is approximation of model $\Sigma_4$ where the different model parameters are substituted with real values and higher orders are discarded where appropriate. Model $\Sigma_6$ is included for resemblance with model $\Sigma_2$.

TABLE 1

Image formation models used for correction of inhomogeneities.
$\phi^v$ is a polynomial model of order v.

| Model | Correction |
|---|---|
| $\sum_1^v$ | $\hat{U} = N \cdot \phi^v$ |
| $\sum_2^v$ | $\hat{U} = N + \phi^v$ |
| $\sum_3^v$ | $\hat{U} = N \cdot \phi_1^v + \phi_2^v$ |
| $\sum_4^v$ | $\hat{U} = N \cdot \exp\left(\dfrac{\sqrt{\phi_1^v}}{\phi_2^{v-1}}\right)$ |
| $\sum_5^v$ | $\hat{U} = N \cdot \dfrac{\phi_1^v}{\phi_2^{v-1}}$ |
| $\sum_6^v$ | $\hat{U} = N + \dfrac{\phi_1^v}{\phi_2^{v-1}}$ |

Fourth Embodiment

In a fourth embodiment according to the present invention, a statistical mixture model of the image is generated based on a plurality of K image regions.

Each of these regions or classes may physically correspond to e.g. bone, soft tissue and direct exposure area.

In the assumption or a normal mixture model, each class is represented by three unknown parameters: the proportion $\pi_k$ of image pixels, the mean value $\mu_k$ and the variance $\sigma_k^2$.

The set $\psi$ collectively comprising all unknown parameters becomes:

$$\psi = \{\pi_1, \ldots, \pi_K, \mu_1, \ldots, \mu_K, \sigma_1^2, \ldots, \sigma_K^2\}$$

The subset of parameters pertaining to class k is denoted as $$\psi_k = \{\pi_k, \mu_k, \sigma_k^2\}$$

The image intensity histogram, de-noting the probability distribution that a pixel i has intensity $y_i$ is therefore a Gaussian mixture model $$f(y_i | \psi) = \sum_{k=1}^{K} \pi_k f_k(y_i | \psi_k)$$

$$= \sum_{k=1}^{K} \pi_k \frac{1}{\sqrt{2\pi\sigma_k^2}} \exp\left(-\frac{(y_i - \mu_k)^2}{2\sigma_k^2}\right) \quad i = 1, \ldots, N$$

The Basic EM Algorithm

The classical analytical method to estimate the parameter $\psi$ is to maximise the log-likelihood function for each of then parameters to estimate.

The maximum likelihood estimates of each parameter can be solved from a system of equations which is non-linear in general and hence requires methods such as Newton-Raphson algorithm.

The Expectation-Maximisation (EM) algorithm estimates the parameters $\psi$ by adding segmentation labels $z_i$ (i represents pixel i and $z_i$ has a value k, k=1 . . . K), (so called non-observable data) to each of the grey values $y_i$ of the pixels (so called observable data).

In each iteration of the EM algorithm the expectation step (E-step) estimates a segmentation label k to each pixel i on the basis of parameter values $\psi$ from the previous iteration and in the maximisation step (M-step) new parameter values $\psi$ are computed on the basis of maximum likelihood, given the new segmentation labels associated with each of the newly assigned segmentation labels.

The Extended EM Algorithm

In the context of the present invention two modifications have been added to the EM algorithm to make it correcting for a bias field caused by global inhomogeneities in the imaging chain and to discard outliers due to local inhomogeneities.

The global inhomogeneities in the image distort the assumed normal distribution of the pixel classes.

Every pixel segmentation class is modelled as a normal distribution of which a sum of spatially correlated continuous basis functions is subtracted.

Examples of such basis functions are orthogonal polynomials. Other orthogonal continuous functions may be used as well.

The coefficients of the basis polynomials are added to the parameter set $\psi$ which must be estimated $$\psi = \{\pi_1, \ldots, \pi_K, \mu_1, \ldots, \mu_K, \sigma_1^2, \ldots, \sigma_K^2, C\}$$
$$= \{\pi_1, \ldots, \pi_K, \mu_1, \ldots, \mu_K, \sigma_1^2, \ldots, \sigma_K^2, c_1, \ldots, c_R\}$$

with the probability distribution for the pixels belonging to segmentation class k $$f_k(y | \Psi_k C) = \frac{1}{\sqrt{2\pi\sigma_k^2}} \exp\left[-\frac{1}{2\sigma_k^2}\left(y - \mu_k - \sum_{r=t}^{R} c_r \Phi_r\right)^2\right] \quad k = 1, \ldots, K$$

with $\phi_r$ a N×1 vector holding the polynomial function evaluation for the r-th basis polynomial at pixel location i (i=1, . . . N).

A further correction to the basic EM algorithm is to make it robust against outliers in the observed distribution of a segmentation class, caused by the presence of local defects (dust, scratch, pixel drop out . . . ) in the recording member, said defects not being attributable to the global inhomogeneities.

To this purpose each pixel class k is divided in a Gaussian class (which is distributed by the inhomogeneity and which is corrected by the bias function) and a rejection class. This rejection class is assumed to have a uniform distribution with probability density $\delta_k$ and contains a proportion $\epsilon \in [0,1]$ of the pixels. The probability distribution of pixel class k is therefore $$f_{k\epsilon}(y_i|\psi_k) = (1-\epsilon) f_k(y_i|\psi_k) + \epsilon \delta_k$$

Summary of the Extended EM Algorithm

The extended EM algorithm is summarised by the following formulas valid for iteration m:

E-Step:

For each pixel class k, k=1, . . . K and each pixel i, i=1, . . . N, compute $$p_{ik}^{(m+1)} = \frac{f_k(y_i \mid \psi_k^{(m)})\pi_k^{(m)}}{\sum_{i=1}^{K} f_i(y_i \mid \psi_k^{(m)})\pi_i^{(m)}}$$

$$\lambda_k^{(m+1)} = \frac{1}{\sqrt{2\pi\sigma_k^2}} \exp\left(-\frac{1}{2}\kappa^2\right)$$

$$t_{ik}^{(m+1)} = \frac{f_k(y_i \mid \psi_k^{(m)})}{f_i(y_i \mid \psi_k^{(m)}) + \lambda_k^{(m+1)}}$$

with $y_i$ denoting the intensity values of pixel i $\psi_k^{(m)}$ the set of statistical parameter describing class k at iteration m $\psi_k^{(m)}$ the proportion of pixels in the image belonging to class k at iteration m $f_k$ the probability density function of intensity of pixels of class k denoting the conditional probability that pixel i has gray value $y_i$ given parameters $\psi_k$ of class k $p_{ik}^{(m+1)}$ the probability that pixel i belongs to class k at iteration m+1, these probabilities sum to 1, i.e.

$$\sum_{k=1}^{K} p_{ik}^{(m+1)} = 1.$$

$\sigma_k^{2(m)}$ the variance of intensity of pixels belonging to class k at iteration m, k, a threshold on the Mahalanobis distance defined as $$d_k = \left|\frac{(y_i - \mu_k)}{\sigma_k}\right|$$

$\lambda_k^{(m+1)}$ the probability of pixels of class k being outliers, $$t_{ik}^{(m+1)}$$

the probability of pixels inside class k to belong to the non-rejected group (i.e. not being an outlier). Because $\lambda_k \neq 0$, this probability may be less than one, and hence $$\sum_{k=1}^{K} p_{ik}^{(m+1)} t_{ik}^{(m+1)} \leq 1.$$

At this stage, a segmentation of the image could be obtained by a hard classification, i.e. each pixel i is assigned class k for which $p_{ik}^{(m+1)}$ is maximal, i.e. class pixel $$i = \mathrm{argmax}_k \{p_{ik}^{(m+1)}\}.$$

In the sequel of the EM algorithm, soft classification labels $p_{ik}^{(m+1)} \in [0 \ldots 1]$ are used.

M-Step

For each class k=1 ... K and for each coefficient $c_r$, r=1 ... R applied to the corresponding polynomial basis function, compute $$\pi_k^{(m+1)} = \sum_{i=1}^{N} \frac{p_{ik}^{(m+1)}}{N}$$

$$\mu_k^{(m+1)} = \frac{\sum_{i=1}^{N} p_{ik}^{(m+1)} t_{ik}^{(m+1)} \left(y_i - \sum_{r=1}^{R} c_r^{(m)} \varphi_{ir}\right)}{\sum_{i=1}^{N} p_{ik}^{(m+1)} t_{ik}^{(m+1)}}$$

$$\sigma_k^{2(m+1)} = \frac{\sum_{i=1}^{N} p_{ik}^{(m+1)} t_{ik}^{(m+1)} \left(y_i - \mu_k^{(m+1)} - \sum_{r=1}^{R} c_r^{(m)} \varphi_{ir}\right)^2}{\sum_{i=1}^{N} p_{ik}^{(m+1)} t_{ik}^{(m+1)}}$$

$$C^{(m+1)} = \begin{bmatrix} c_1^{(m+1)} \\ c_2^{(m+1)} \\ \cdots \\ c_R^{(m+1)} \end{bmatrix} = (A^T W^{(m+1)} A)^{-1} A^T W^{(m+1)} R^{(m+1)}$$

with $$A = \begin{bmatrix} \varphi_{11} & \varphi_{12} & \cdots & \varphi_{1R} \\ \varphi_{21} & \cdots & & \cdots \\ \cdots & & & \cdots \\ \varphi_{NI} & \cdots & \cdots & \varphi_{NR} \end{bmatrix}$$

$$W^{(m+1)} = \begin{bmatrix} w_1^{(m+1)} & 0 & \cdots & 0 \\ 0 & w_2^{(m+1)} & & \cdots \\ \cdots & & \cdots & 0 \\ 0 & \cdots & 0 & w_N^{(m+1)} \end{bmatrix},$$

$$w_i^{(m+1)} = \sum_{k=1}^{K} \frac{p_{ik}^{(m+1)} t_{ik}^{(m+1)}}{\sigma_k^{2(m+1)}}$$

$$R^{(m+1)} = \begin{bmatrix} y_1 - \bar{y}_1^{(m+1)} \\ y_2 - \bar{y}_2^{(m+1)} \\ \cdots \\ y_N - \bar{y}_N^{(m+1)} \end{bmatrix},$$

$$\bar{y}_i^{(m+1)} = \frac{\sum_{k=1}^{K} \frac{p_{ik}^{(m+1)} t_{ik}^{(m+1)}}{\sigma_k^{2(m+1)}} \mu_k^{(m+1)}}{\sum_{k=1}^{K} \frac{p_{ik}^{(m+1)} t_{ik}^{(m+1)}}{\sigma_k^{2(m+1)}}}$$

wherein $\mu_k^{(m+1)}$ denotes the mean intensity value of pixels belonging to class k at iteration (m+1), $\sigma_k^{2(m+1)}$ denotes the variance of intensity value of pixels belonging to class k at iteration (m+1), after having corrected for the estimate of the bias field, $C^{(m+1)}$ is a vector containing coefficients $c_r$, $r=1 \ldots R$ applied to the corresponding polynomial basis function, $A(i,r)=\phi_{ir}$ is the evaluation of the M-th polynomial basis function at pixel location i (matrix A thus represents the geometry of the bias field model), $W^{(m+1)}$ is a diagonal matrix of weights $w_i^{(m+1)}$, $i=1 \ldots N$, with $w_i^{(m+1)}$ the weight applied at pixel i in iteration (m+1). Said weight is the sum of the inverse of variance overall classes k, $k=1 \ldots K$, each weighted with the probability of that class which is $p_{ik}^{(m+1)} t_{ik}^{(m+1)}$.

$R^{(m+1)}$ is a residue image, the residue being the difference between the original image matrix $y_i$, $i=1 \ldots N$ and the corrected image matrix $\tilde{y}_i^{(m+1)}$ at iteration (m+1).

The equations of the extended EM algorithm reduce to the basic EM algorithm when no bias correction is performed (all $c_r=0$) or no outliers are taken into account (all $\lambda_k=0$ and hence all $t_{ik}=1$).

Initialization

In order to start the iterations of the EM algorithm, an initial estimate $\psi(0)$ for the parameter set $\psi$ is needed.

This is achieved by assigning each pixel i, $i=1 \ldots N$, to one of the classes $k=1 \ldots K$ on the basis of intensity histogram slicing.

This assignment involves the computation of $p_{ik}^{(0)}$, which is a hard assignment of probability 1 to one of the k possible class probabilities at pixel i and putting all other probabilities no zero.

Furthermore, no outliers are assumed during initialisation, i.e. $t_{ik}^{(0)}=1$ for all i.

Therefore the M-step in which the values $\psi$ are computed can be executed immediately after initialisation.

Therefore the initialisation on step for which the iteration value m=0 does not present a true iteration step in the EM algorithm.

To slice the histogram into K distinct initial pixel classes $k=1 \ldots K$, prior art techniques are used. In the context of the present invention, the histogram is smoothed and approximated with a higher order polynomial, after which the two or three most important maxima are determined. The intensity thresholds separating intensities of different classes are then determined as the intensities corresponding to the minima between these different maxima.

The invention claimed is:

1. A method for correction of intensity inhomogeneities in a digital radiation image comprising:
   (1) exposing an object to radiation emitted by a source of radiation,
   (2) recording a diagnostic radiation image of said object on a radiation-sensitive recording member,
   (3) reading the diagnostic radiation image that has been recorded on said recording member and converting the read image into a digital image representation, wherein said digital image representation at least comprises a digital representation of a direct exposure area and of diagnostic areas,
   (4) generating a mathematical model of a cause of said intensity inhomogeneities,
   (5) image segmenting said digital image representation in order to extract data representing an estimation of the direct exposure area,
   (6) deducing parameters of said mathematical model from image data corresponding to said direct exposure area,
   (7) generating a bias field on the basis of the deduced parameters,
   (8) correcting said image by means of said bias field so as to obtain a corrected image,
   (9) subjecting the corrected image to a stopping criterion, steps (5) to (9) are repeated on the corrected image until the stopping criterion is met.

2. A method according to claim 1 wherein said cause of inhomogeneities is the Heel effect introduced by an X-ray source.

3. A method according to claim 1 wherein said cause of inhomogeneities is the non-uniform sensitivity of a radiation detector.

4. A method according to claim 1 wherein said stopping criterion is met when no significant changes occur in said estimation of the direct exposure area or in the parameters of said mathematical model.

5. A method for correction of intensity inhomogeneities in a digital radiation image comprising:
   (1) exposing an object to radiation emitted by a source of radiation,
   (2) recording a diagnostic radiation image of said object on a radiation-sensitive recording member,
   (3) reading the diagnostic radiation image that has been recorded on said recording member and converting the read image into a digital image representation, wherein said digital image representation at least comprises a digital representation of a direct exposure area and of diagnostic areas,
   (4) generating an information theoretic model of said image based on Shannon-Wiener entropy,
   (5) image segmenting said digital image representation in order to extract data representing an estimation of the direct exposure area,
   (6) extracting the entropy in said model by means of data pertaining to said image regions,
   (7) generating a bias field,
   (8) correcting said image by means of said bias field,
   (9) evaluating the result of step (8) relative to a stopping criterion and steps (4) to (9) are repeated until said stopping criterion is met.

6. A method for correction of intensity inhomogeneities in a digital radiation image comprising:
   (1) exposing an object to radiation emitted by a source of radiation,
   (2) recording a diagnostic radiation image of said object on a radiation-sensitive recording member,
   (3) reading the diagnostic radiation image that has been recorded on said recording member and converting the read image into a digital image representation, wherein said digital image representation at least comprises a digital representation of a direct exposure area and of diagnostic areas,
   (4) generating an information theoretic model of said image based on Shannon-Wiener entropy,
   (5) image segmenting said digital image representation in order to extract data representing an estimation of the direct exposure area,
   (6) extracting the entropy in said model by means of data pertaining to said image regions,
   (7) generating a bias field,
   (8) correcting said image by means of said bias field,
   (9) evaluating the result of step (8) relative to a stopping criterion and steps (4) to (9) are repeated until said stopping criterion is met wherein said stopping criterion is met when said entropy is minimal and no significant changes occur in the entropy value.

* * * * *

UNITED STATES PATENT AND TRADEMARK OFFICE
CERTIFICATE OF CORRECTION

PATENT NO. : 7,382,908 B2 Page 1 of 1
APPLICATION NO. : 11/470165
DATED : June 3, 2008
INVENTOR(S) : Piet Dewaele and Gert Behiels It is certified that error appears in the above-identified patent and that said Letters Patent is hereby corrected as shown below:

Title Page, Item (*) Notice: insert on Line A,

--This patent is subject to a terminal disclaimer relative to patent No. 7,110,588.--

Signed and Sealed this

Second Day of September, 2008

JON W. DUDAS
*Director of the United States Patent and Trademark Office*